United States Patent [19]

Wang

[11] Patent Number: 5,473,017
[45] Date of Patent: Dec. 5, 1995

[54] INTERVULCANIZED ELASTOMER BLENDS

[75] Inventor: Hsien-Chang Wang, Bellaire, Tex.

[73] Assignee: Exxon Chemical Patents Inc., Wilmington, Del.

[21] Appl. No.: 305,547

[22] Filed: Sep. 14, 1994

Related U.S. Application Data

[63] Continuation-in-part of Ser. No. 129,292, Sep. 30, 1993, abandoned.

[51] Int. Cl.$^6$ .................. C08L 7/00; C08L 9/00; C08L 11/00; C08L 13/00; C08L 23/22
[52] U.S. Cl. .............. 525/193; 525/192; 525/194; 525/195; 525/232; 525/912; 525/215; 525/233; 524/525
[58] Field of Search .................. 525/192, 193, 525/194, 195, 232

[56] References Cited

U.S. PATENT DOCUMENTS

| | | |
|---|---|---|
| 3,489,822 | 1/1970 | Witt et al. |
| 4,397,987 | 8/1983 | Cornell |
| 4,404,326 | 9/1983 | Chang |
| 4,565,614 | 1/1986 | Buding et al. |
| 4,675,248 | 1/1987 | Buding et al. |
| 5,153,282 | 10/1992 | Datta et al. |
| 5,162,409 | 11/1992 | Mroczkowski |
| 5,162,445 | 11/1992 | Powers et al. |

FOREIGN PATENT DOCUMENTS

| | | |
|---|---|---|
| 53/545A1 | 3/1991 | European Pat. Off. |

OTHER PUBLICATIONS van Drumpt–"Peroxide Cross–Linking: A Strength Weakness Analysis vs Sulfur Vulcanization"–Rubber World Mar. 1988 (4 pages).

JP-04225045 A, Abstract, Nippon Petrochemical.

Gardner et al, "Efficient Cocure", ACS Rubber Div. Meeting Nov. 3, 1992.

Kruse et al, "Industrial Rubber", ACS Rubber Div. Meeting Nov. 3, 1992.

Hopper et al, "Ozone Resistant Blends", International Conference, Lucerne, Switzerland, May 23–25, 1984.

*Primary Examiner*—Carman J. Seccuro, Jr.
*Attorney, Agent, or Firm*—Myron B. Kuntzman

[57] ABSTRACT

Intervulcanized compositions having improved curing efficiency are prepared by the free radical curing of a mixture of an ethylenically unsaturated diolefin polymer such as natural or synthetic rubber and a saturated or low unsaturation polymer such as an isobutylene/para-methylstyrene copolymer which contains functional groups pendant to the polymer chain. These functional groups contain an olefinic or vinyl double bond positioned alpha, beta to a substituent group which activates the double bond towards free radical addition reactions with the diolefin polymer. Preferred functionality includes benzylic ester functionality represented by the structure:

$$-O-\overset{O}{\overset{\|}{C}}-\underset{R_2}{C}=C\overset{R_3}{\underset{R_4}{\diagdown}}$$

wherein $R_2$ and $R_3$ are independently selected from hydrogen or $C_1$ to $C_6$ alkyl, and $R_4$ is selected from hydrogen, $C_1$ to $C_{28}$ alkyl, aryl or $C_2$ to $C_{28}$ alkenyl.

44 Claims, 3 Drawing Sheets

INTERVULCANIZED ELASTOMER BLENDS

This application is a continuation-in-part of copending application Ser. No. 08/129,292, filed Sep. 30, 1993, now abandoned.

BACKGROUND OF THE INVENTION

1. Field of the Invention

This invention relates to the use of unsaturated derivatives of saturated or highly saturated elastomers as elastomer components in the preparation of synergistically covulcanizable elastomer blend compositions.

2. Description of Related Art

Vulcanizates based on blends of elastomers which contain little or no olefinic unsaturation with more highly unsaturated elastomers are of interest in the rubber industry primarily because of their special properties, e.g., superior resistance to ozone degradation and consequent cracking, improved resistance to chemical attack, improved temperature stability and unique dynamic response. Examples of such blends are those containing: (a) one or a mixture of low unsaturation rubbers such as terpolymers of ethylene, propylene and up to about 10 wt % of a non-conjugated diene (EPDM), copolymers of a $C_4$ to $C_7$ isoolefin, e.g., isobutylene, with up to about 20 wt % isoprene (butyl rubber), halogenated butyl rubber and halogenated interpolymers of a $C_5$ to $C_7$ isoolefin, e.g., isobutylene with up to about 20 wt % paraalkylstyrene, e.g., para-methylstyrene, mixed with: (b) one or more ethylenically unsaturated elastomers such as natural rubber, polybutadiene, copolymers of butadiene with styrene or acrylonitrile, and the like.

One of the problems associated with the curing of elastomer compositions containing such chemically diverse materials is the inability to achieve a balanced cure of each individual component and also a truly intervulcanized composition, i.e., a composition where predominant interpolymer crosslinking takes place between different polymer molecules in the different phases. For example, in sulfur curable systems containing a blend of highly unsaturated elastomer such as natural rubber and a low unsaturation elastomer such as EPDM or butyl rubber, the high unsaturation diene phase cures much faster than the low unsaturation phase resulting in a highly cured polydiene phase and an undercured, curative starved low unsaturation phase, with little or no interpolymer crosslinking taking place at the phase boundaries. As a consequence of this lack of curing balance, the vulcanizates may exhibit inferior mechanical properties such as low tensile strength, low modulus, poor hysterisis and the like.

One technique used to minimize the problem of vulcanization imbalance is the use of low or no unsaturation blend components which have been modified by the inclusion of functional-groups in the polymer chain which functional groups are susceptible to crosslinking mechanisms independent of the sulfur curing system used to crosslink the highly unsaturated elastomer. For example, blends containing halogenated butyl rubber or halogenated interpolymers of isobutylene and para-methylstyrene can be vulcanized along with more highly unsaturated rubbers by including an independent curing system for each type of elastomer into the vulcanization recipe, e.g., a zinc oxide-based curing system which normally cures the halorubber and an accelerated sulfur curing system which normally cures the highly unsaturated rubber. However, even in these systems there may be a drop-off of important properties of the cured composition such as modulus, tensile, elongation and the like in comparison to what can be calculated as the composition-based averaging of such properties based on the properties exhibited by each cured elastomer alone, i.e., the "tie line" properties. This drop-off in properties is most likely the result of the lack of ideal solubility (compatibility) of the different phases coupled with the lack of significant interpolymer crosslinking.

It should be noted that the achievement of tie line or above tie line rheometer cure performance in curable elastomer blend systems is an unusual phenomenon and represents optimum cure performance. In most systems, rheometer torque increase for cured blends of different elastomers will lie at least partially below the tie line which would be graphically depicted as a straight line over the blend range connecting the rheometer torque increase values associated with each individual elastomer if cured alone. One blend system which allegedly achieves above tie line performance is disclosed in Hopper et al., "Ozone Resistant Blends" International Conference on Advances in the Stabilization and Controlled Degradation of Polymers, Lucene, Switzerland, May 23–25, 1984. The publication discloses sulfur curable blends of modified EPDM rubber and a polydiene rubber such as natural or polybutadiene rubber exhibiting blend torque increases which are generally slightly above tie line values. The modified EPDM employed is the addition product of an N-chlorothio-N-methyl-p-toluene sulfonamide to elastomeric terpolymers of ethylene, propylene and a non-conjugated diene such as 1,4-hexadiene or dicyclopentadiene.

SUMMARY OF THE INVENTION

The present invention is directed towards truly intervulcanizable blends comprising a mixture of a diolefin polymer or copolymer and a saturated or highly saturated elastomeric copolymer having a number average molecular weight of at least 10,000 and containing from about 0.01 up to about 10 mole % of "Y" functional groups randomly distributed along and pendant to the elastomeric polymer chain, said Y functional groups containing an olefinic or vinyl double bond positioned alpha, beta to a substituent group which activates said double bond towards free radical addition reactions. The preferred activating substituent groups are carboxyl-containing groups, phosphoryl-containing groups, sulfonyl-containing groups, nitrile-containing groups, aromatic ring-containing groups or a combination of such groups.

The present invention also provides for an intervulcanized composition of a blend of elastomers, the blend comprising a diolefin polymer or copolymer and a saturated or highly saturated polymer having covalently bonded along the polymer backbone a group containing a free olefinic or vinyl double bond positioned alpha, beta to said substituent group which activates the double bond for free radical addition reactions in the presence of a free radical generator.

In a preferred embodiment, the elastomeric copolymer is a copolymer of at least one $C_2$–$C_8$ alphamonoolefin with a non-conjugated diene or a paraalkylstyrene.

In another preferred embodiment, the pendant Y groups are ester groups represented by the structure 1:

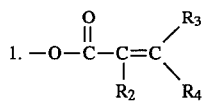

wherein $R_2$ and $R_3$ are independently selected from the group consisting of hydrogen and alkyl containing 1 to about 6 carbon atoms, and $R_4$ is selected from the group consisting of hydrogen, an aryl group, e.g., phenyl, an alkyl group containing from 1 to about 28 carbon atoms and an alkenyl group containing from 2 to about 28 carbon atoms.

It has been found that the cure of compositions containing such blends by ordinary curing mechanisms which generate free radicals in the diolefin polymer, e.g., accelerated sulfur cures, peroxide cures, radiation cures and the like, results not only in the individual crosslinking of the blend components themselves but also crosslinking involving the free radical generated in the diolefin polymer and the double bonds present pendant to the chain of the elastomeric copolymer which serve as free radical acceptors. Synergistic curing efficiency is reflected by rheometer torque increases that are consistently above the tie line values which might be expected based on the cure of compositions containing the individual elastomer components themselves.

Where the elastomeric copolymer is one containing no in-chain unsaturation, the resulting vulcanizate has enhanced ozone resistance, chemical resistance, high temperature stability and improved dynamic response. In particular, intervulcanized blends of this invention exhibit improved modulus and tensile properties as compared with vulcanizates from blends of diolefin polymers and elastomeric copolymers which are devoid of the Y functional groups described above, more specifically improved tensile strength, compression set and tension set properties.

DETAILED DESCRIPTION OF THE INVENTION

The present invention provides a curable composition based on a mixture or blend of a functionalized elastomeric copolymer (a) and a different diolefin polymer or copolymer (b) characterized that when formulated with a curing system, e.g., a sulfur curing system or a peroxide curing system, and subjected to vulcanization conditions, the blend composition exhibits a maximum rheometer torque increase ratio in accordance with the formula:

$$\Delta M_{a+b}/\Delta M_a f_a + \Delta M_b f_b)$$

of greater than 1.25, preferably greater than 1.5 and more preferably greater than 2.0, wherein:

$\Delta M_{a+b}$=the torque increase observed for the blend of polymer (a) and polymer (b);

$\Delta M_a$=the torque increase observed for polymer (a) on its own;

$f_a$=the weight fraction of polymer (a) in the blend;

$\Delta M_b$=the torque increase observed for polymer (b) on its own;

$f_b$=the weight fraction of polymer (b) in the blend.

The cure characteristic of torque increase ($\Delta M$), also designated as $M_H$-$M_L$, is evaluated using a Monsanto Rheometer at 3° arc in accordance with ASTM procedure D-2084-71T. $M_L$ represents minimum pre cure torque and $M_H$ represents the highest torque achieved under cure conditions, e.g., at 160° C. and 60 minute cure time. The torque increase due to vulcanization is therefore the value of $M_H$ minus the value of $M_L$, ($M_H$-$M_L$) measured in pound-inches (1b.-in.).

Figure 3:
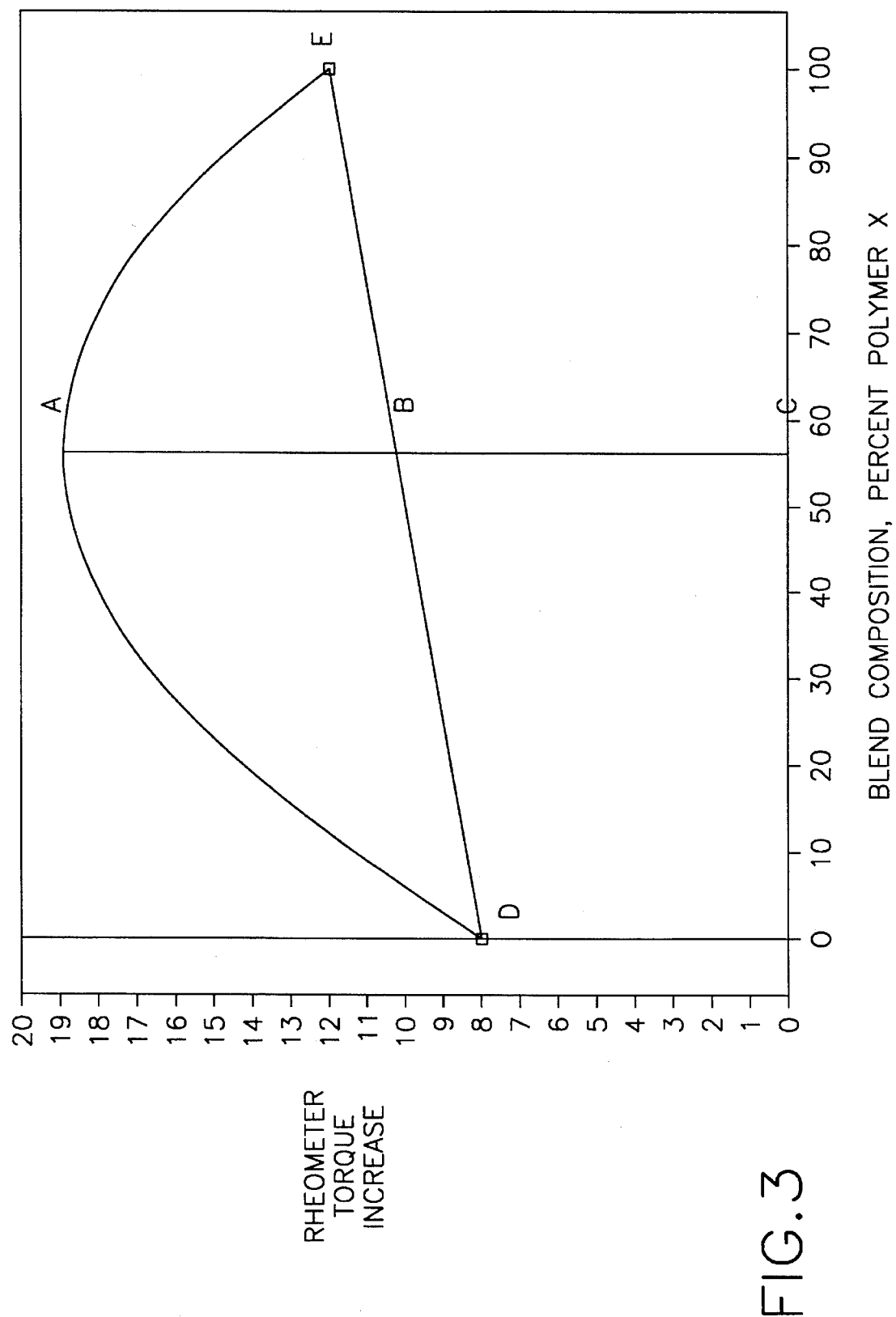
FIG. 3 is a general graphic illustration plotting tie-line values and torque increase values for elastomer blend compositions based on varying content of blend components.

The blend composition of the invention exhibits a synergistic curing effect in the sense that the curing agent promotes intermolecular bonding between molecules of polymer (a) and polymer (b). FIG. 3 illustrates conceptually the plot of rheometer torque increase versus composition for blends of the present invention. In particular, the blends of the present invention will show a plot similar to the curved line DAE in FIG. 3. The points D and E, further identified with squares, represent the rheometer torque increases observed for polymers (a) and (b) on their own. The characteristic feature of the present invention reflected in this plot is that for any blend (i.e., excluding the points D and E), the curved line DAE is consistently above the straight line DBE. The straight line DBE is referred to as the "tie line" and represents the weighted average of the rheometer torque increases for the individual polymers (a) and (b). Hitherto, tie line performance has been regarded as the ultimate achievement in cocuring. However, it should be noted that this can and often is achieved simply by optimizing the individual intrapolymer cocuring of each of the polymers in the blend. The achievement of tie line performance does not imply the occurrence of interpolymer cocuring. On the other hand, a rheometer torque increase plot that is consistently and significantly above the tie line, as in the curved line DAE in FIG. 1, is indicative of effective interpolymer cocuring.

It should be noted that the achievement of tie line performance is an unusual phenomenon and that for most systems the plot of rheometer torque increase versus composition will lie, at least partially, below the tie line. This point is illustrated by the comparative examples of the present invention.

Figure 1:
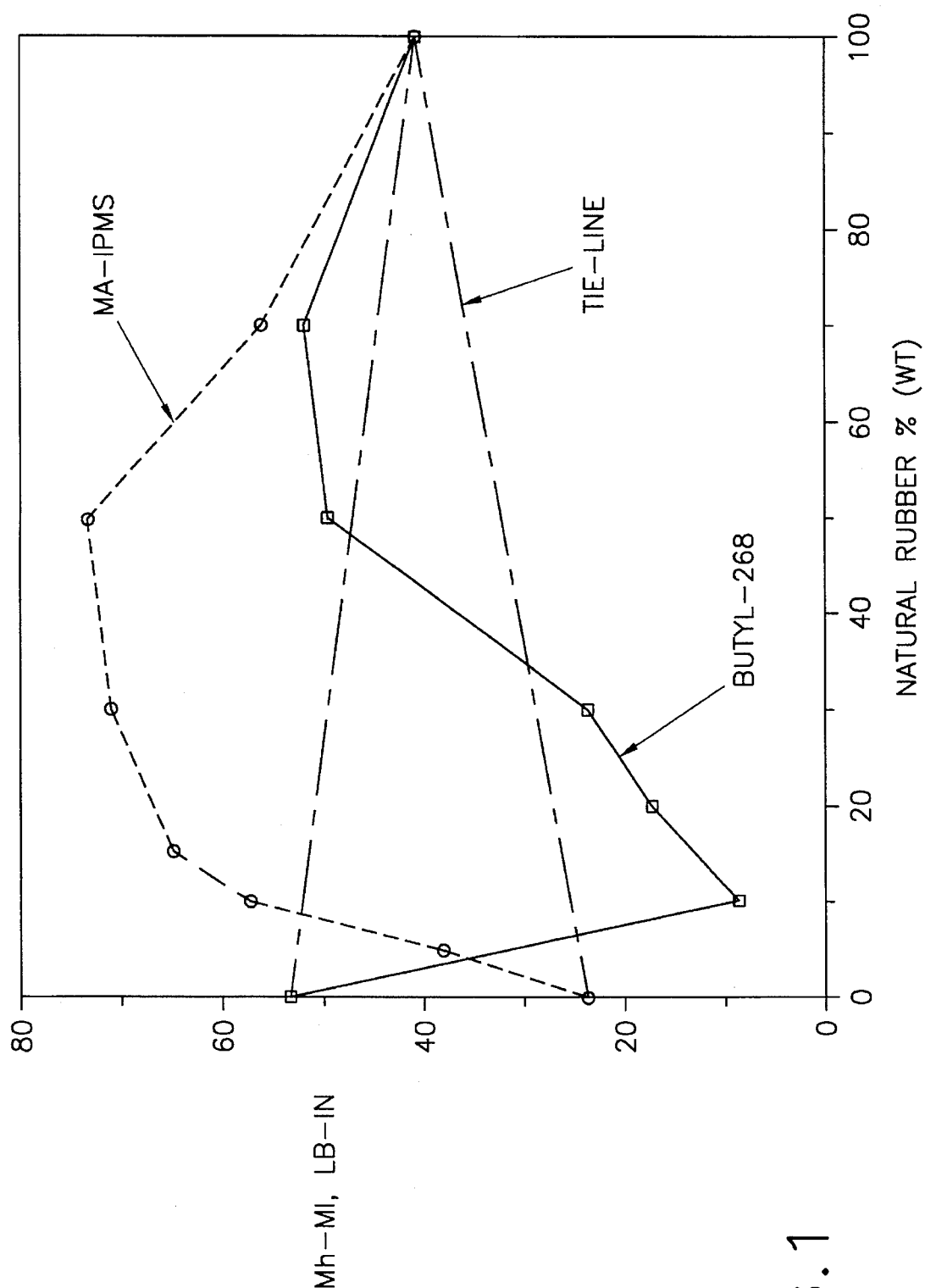
FIG. 1 is a plot of curing behavior as indicated by rheometer torque values vs. composition for blends containing natural rubber and a methacrylate modified terpolymer containing isobutylene and paramethylstyrene, as well as blends of natural rubber and butyl rubber.

The extent of interpolymer cocuring of a polymer blend may be measured by the ratio AC/BC in FIG. 1. This ratio is a graphical depiction of the maximum rheometer torque increase ratio ($\Delta Ma+b$) described above. For typical compositions of the prior art, for which the observed plot is not consistently above the tie line, this quantity is not conveniently measurable. For the few compositions of the prior art that achieve tie line performance, the value for this ratio is unity. For the compositions of the present invention this ratio is greater than 1.25 preferably greater than 1.5, most preferably greater than 2.0.

The elastomeric copolymer forming component (a) of the blends of this invention are copolymers of at least one $C_2$ to $C_8$ alpha monoolefin which contain little or no olefinic unsaturation along the polymer chain and which have been functionalized by reaction with functional reagents containing an olefinic or vinyl double bond positioned alpha, beta to a substituent group which activates the double bond towards free radical addition reactions when contacted with a free radical source under free radical generation conditions. These copolymers are thus able to participate in intercrosslinking reactions as free radical acceptors of the free radicals generated in the diolefin polymer (b) component of the blend under free radical curing conditions.

In addition to having the double bond as described above, the functional reagent must contain a nucleophilic moiety (anion) which is reactive with electrophilic groups present on the backbone of the elastomeric copolymer, e.g., halogen, hydroxy, and the like groups. The nucleophilic moiety may be an anion derived from alcohol, phenol, carboxylic acid, thioalcohol, thiophenol, thiocarboxylic acid or imide, or a neutral nucleophile such as a tertiary amine. The double bond activating moiety may be a carbonyl containing group (e.g., COR, COOR, CONR$_2$, in which R is alkyl or aryl), a phosphoryl or sulfonyl containing group [e.g., PO(OR)$_2$ or SO$_2$OR, in which R is alkyl or aryl], a nitrile-containing group or an aromatic ring-containing group, or a combination of such groups.

Exemplary of suitable reagents containing both double bond and nucleophilic functionality include the following:

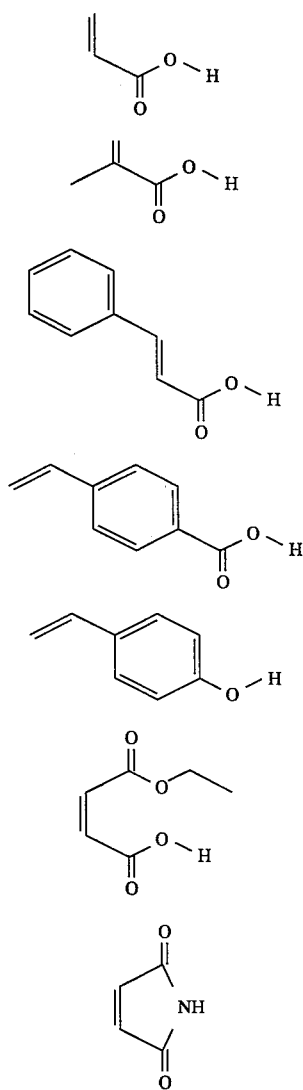

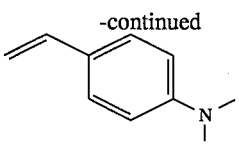

Suitable anions include those derived by the reaction of bases, e.g., tetraalkylammonium salts, with the compounds I to VII to remove the acidic hydrogen shown by "H". Included are acrylate (I) and methacrylate (II) anions, in which the carboxyl group serves as both nucleophile and double bond activator. In anions derived from compounds (III) and (IV) the carboxyl group serves as the nucleophile and as an activating group either by being situated directly on the double bond (III) or by extended conjugation with the double bond through the aromatic ring (IV). In both compounds (III) and (IV) and aromatic ring itself provides additional activation of the double bond. In the anion derived from compound (V), the aromatic ring is the sole double bond activating species and the nucleophile is a phenoxy anion. Anions derived from the compounds monoethyl maleate (VI) or maleimide (VII) have double bonds activated by two carbonyl containing groups and are suitable for the present invention. Thio analogs of anions derived from compounds (I) to (VI) are also suitable.

Suitable neutral nucleophilic reagents include tertiary amines such as 4-dimethylaminostyrene (VIII). Additionally the sulfur analog of the compound (V) may be sufficiently nucleophilic to be useful in the present invention without conversion to the corresponding anion. 10 Suitable reagents meeting the criteria set forth above include unsaturated acids containing carbonyl functionality conjugated with the double bond such as acrylic acid methacrylic acid and the like; vinyl aromatic reagents such as para-hydroxy styrene, para-alkoxy styrene and 4-vinyl benzoic acid; unsaturated dicarboxylic acid derivatives such as monoalkyl maleates and maleimide; and like reagents. Depending on the nature of the reagent nucleophile, these reagents can be made to react with electrophilic groups present in the backbone chain of the elastomeric copolymer to form ester, ether, amido or other linkages.

Examples of such nucleophilic substitution reactions with halogenated copolymers of isobutylene and para-methylstyrene are found in U.S. Pat. No. 5,162,445, the complete disclosure of which is incorporated herein by reference.

The present invention will be more particularly described as it applies to curable blends containing a benzylic ester-functionalized derivative of a C$_4$ to C$_7$ isomonoolefin and a para-alkylstyrene as the elastomeric copolymer component of the blend. These materials may be prepared by reacting a halogenated copolymer of a C$_4$ to C$_7$ isoolefin, as described below, with a nucleophilic reagent having the formula:

wherein M is hydrogen, a metal ion or an onium ion and R$_2$, R$_3$ and R$_4$ are as described in Formula 1 above, under reaction conditions such that at least a portion, and preferably substantially all, of the benzylic halide atoms present in the halogenated copolymer structure are displaced via a nucleophilic substitution reaction and replaced with the corresponding ester group. In Formula 1 above, R$_2$ is preferably hydrogen or methyl, R$_3$ is preferably hydrogen and R$_4$ is preferably hydrogen or C$_3$ to C$_{12}$ alkenyl.

The halogenated $C_4$–$C_7$ isoolefin/para-alkylstyrene starting materials are the halogenation product of random copolymers of a $C_4$ to $C_7$ isoolefin, such as isobutylene, and a para-alkyl styrene comonomer, preferably para-methylstyrene containing at least about 80%, more preferably at least about 90% by weight of the para isomer, and wherein at least some of the alkyl substituent groups present in the styrene monomer units contain halogen. Preferred materials may be characterized as isobutylene interpolymers containing the following monomer units randomly spaced along the polymer chain:

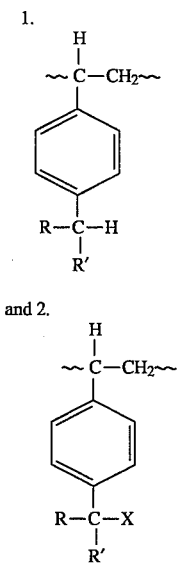

wherein R and R' are independently hydrogen, lower alkyl, preferably $C_1$ to $C_4$ alkyl, and X is bromine or chlorine, and wherein the interpolymer is otherwise substantially free of ring halogen or halogen in the polymer backbone chain. Preferably R and R' are each hydrogen. Up to about 60 mole % of the para-alkylstyrene present in the interpolymer structure may be the halogenated structure (2) above.

Most useful of such materials are elastomeric copolymers of isobutylene and para-methylstyrene containing from about 0.5 to about 20 mole % paramethylstyrene wherein up to about 60 mole % of the methyl substituent groups present on the benzyl ring contain a bromine or chlorine atom, preferably a bromine atom. These copolymers have a substantially homogeneous compositional distribution such that at least 95% by weight of the polymer has a para-alkylstyrene content within 10% of the average para-alkylstyrene content of the polymer. They are also characterized by a very narrow molecular weight distribution (Mw/Mn) of less than about 5, more preferably less than about 2.5, a preferred viscosity average molecular weight in the range of from about 300,000 up to about 2,000,000, and a preferred number average molecular weight in the range of from about 25,000 to about 750,000, as determined by Gel Permeation Chromatography.

The copolymers may be prepared by slurry polymerization of the monomer mixture using a Lewis Acid catalyst, followed by halogenation, preferably bromination, in solution in the presence of halogen and a radical initiator such as heat and/or light and/or a chemical initiator.

Preferred brominated copolymers generally contain from about 0.1 to about 5 mole % of bromomethyl groups, most of which is monobromomethyl, with less than 0.05 mole % dibromomethyl substituents present in the copolymer. These copolymers, their method of preparation, their method of cure and graft or functionalized polymers derived therefrom are more particularly disclosed in the above referenced U.S. Pat. No. 5,162,445. The acrylic and methacrylic ester functionalized derivatives of these copolymers are particularly disclosed in Examples 112 F-1 and 112 F-2 of this patent. Other functionalized derivatives, some of which are useful in the present invention, are described in other portions of this patent.

The nucleophilic substitution reaction described above is preferably conducted in solution using a solvent system which will dissolve the halogenated isoolefin/para-alkylstyrene copolymer and provide a solution or dispersion of both the polymer and nucleophilic reagent so as to achieve intimate contact between the benzylic halogen of the base polymer and the nucleophile. Suitable solvents include benzene, toluene, alkanes such as heptane, hexane, and cyclohexane and oxygen-containing solvents or solvent mixtures such as tetrahydrofuran or mixtures thereof with lower alcohols.

The reaction is preferably conducted under mild reaction conditions so as to avoid the formation of crosslinked or gelled products and minimize unwanted side reactions. Preferred reaction temperatures range from about 20° to 100° C. The formation of the desired reaction product is facilitated under mild reaction conditions by utilizing the onium salt of the nucleophilic agent as a reactant, i.e., the tetrabutyl ammonium salt.

Acids which may be used to form the ester nucleophile include those which contain ethylenic or vinyl unsaturation conjugated with a carbonyl group, e.g., acrylic acid, methacrylic acid, sorbic acid, cinnamic acid and the like, as well as mixtures thereof. The resulting reaction product may be characterized as a random interpolymer comprising at least about 80 weight % of polymerized isoolefin containing 4 to 7 carbon atoms and from about 0.05 up to about 20 weight % of aromatic monomer units comprising a mixture of the following structure randomly distributed therein:

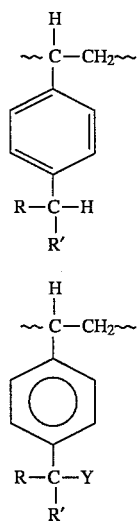

wherein R and R' are independently selected from the group consisting of hydrogen and $C_1$ to $C_4$ alkyl and Y is as defined in formula 1 above. Where all halogens present in the polymer are completely displaced, the resulting product is a terpolymer; where the halogens are only partially displaced, the resulting product is a tetrapolymer which would also include some unreacted halogen-containing monomer units as defined by monomer unit 2 above. The more preferred materials are terpolymers containing at least about 95 mole % of polymerized isobutylene and the balance a mixture of predominantly para-methylstyrene and less predominantly 4-(acryloyloxy-methyl) styrene, 4-(methacryloyloxymethyl) styrene, 4-(cinnamoyloxy-methyl) styrene or 4-( 2,4-hexandienoyloxy-methyl) styrene.

Ester-functional elastomers which may be used as blend components in the present invention also include ester-modified elastomeric terpolymers of ethylene/propylene and up to about 10 wt % non-conjugated diene (EPDM) such as dicyclopentadiene, 1,4-hexadine, 5-methylene-2-norbornene and 5-ethylidene-2-norbornene. The ester functionalized derivative of these elastomers may be prepared by polymerizing ethylene, propylene and an alcohol, e.g., a 5-norbornene- 2-methanol derivative of the non-conjugated diene under Zeigler-Natta polymerization conditions which give rise to alcohol functionalized derivative of the EPDM, as disclosed in U.S. Pat. No. 5,153,282, particularly Example 18, the complete disclosure of which patent is incorporated herein by reference. Conventional reaction of this product with the appropriate acid salt or chloride yields modified EPDM polymers containing the Y ester groups as defined above attached to and pendant to the diene moiety of the polymer chain.

The diolefin polymer component with which the modified elastomeric component may be blended include high or low unsaturation polymers which contain conjugated or non-conjugated diene linkage. These include elastomeric polymers such as polybutadiene, natural rubber, synthetic polyisoprene, polychloroprene, copolymers of butadiene with up to about 40 wt % of styrene or acrylonitrile, as well as relatively low unsaturation diolefin polymers such as copolymers of ethylene, propylene and up to 10 wt % of a non-conjugated diene such as norbornadiene, dicyclopentadiene, 1,4-hexadiene, 5-methylene-2-norbornene, 5-ethylidene-2-norbornene and the like, and copolymers of isobutylene and up to 10 wt % of isoprene, and mixtures thereof. The diolefin polymer may also be non-elastomeric and may include liquid to waxy polybutadiene or butadiene/acrylonitrile copolymers having a number average molecular weight in the range of about 300 up to 10,000. Preferred diolefin polymers are polybutadiene, copolymers of butadiene with styrene or acrylonitrile, synthetic polyisoprene and natural rubber.

The compositions may contain the elastomeric copolymer and diolefin polymer components in a weight ratio in the range of from about 1:99 to 99:1 each respectively, more preferably in the range of from about 10:90 to 90:10 and most preferably from about 25:75 to 75:25.

As indicated above, the curing reaction is initiated by subjecting the blended mixture to curing conditions which will generate free radicals and under conditions of mixing which will assure contact of these activated polymer chains with the polymer chains of the elastomeric copolymer containing the ester groups which serve as free radical acceptors. This maximizes interpolymer crosslinking between the different polymer chains as well as intrapolymer crosslinking within the chains of like polymers.

Suitable crosslinking methods include exposure to high energy radiation (ultra violet, electron-beam or gamma) or the inclusion of a suitable peroxide or accelerated sulfur vulcanizing system into the elastomer formulation.

Examples of suitable peroxides include organic peroxides such as dialkyl peroxides, ketal peroxides, aralkyl peroxides, peroxyethers and peroxyesters. Preferred peroxides include di-cumylperoxide, di-tert-butylperoxide, benzoyl peroxide, tert-butylperbenzoate and like known free radical generators. The quantity of peroxide generally ranges from about 1 to about 10% by weight, preferably from about 1.5 to 6% by weight per hundred parts by weight of curable polymer present in the composition.

Accelerated sulfur vulcanization systems which may be used as curatives in the present invention include sulfur or mixtures of sulfur and sulfur-containing accelerators and/or phenol-formaldehyde resins. Suitable accelerators include benzothiazyl disulfide, N-oxydiethylene benzothiazole-2-sulfenamide, 2-mercaptoben-zothiazole, alkyl phenol disulfides, alkyl-thiuram sulfides, m-phenylenebismaleimide, N, $N^1$-diarylguanidines, dialkyl and diaryl-dithiocarbamates, and like materials.

Suitable dialkyldithiocarbamates include the dialkyldithiocarbamates of zinc, bismuth, cadium, copper, lead, selenium, and tellurium wherein the alkyl group contains from 1 to 5 carbon atoms, piperidinium pentamethylenedithiocarbamate and mixtures thereof.

Suitable diarylthiocarbamates include the diaryldithiocarbamates of zinc, bismuth, cadmium, copper, lead, selenium, tellurium, and mixtures thereof.

Suitable alkyl thiuram sulfides include dipentamethylene thiuram tetrasulfide, tetrabutylthiuram disulfide, tetraethylthiuram disulfide, tetramethylthiuram monosulfide, tetrabenzyl thiuram disulfide, and mixtures thereof.

Sulfur and vulcanization accelerators are normally added to the composition at levels in the range of from about 0.5 to about 8% by weight, based on the weight of elastomer present in the composition.

The accelerated sulfur curing system is preferably used as a cocurative in curing systems also containing zinc oxide or an equivalent thereof, as an auxiliary curative agent. Zinc oxide is normally used in such systems at a level of from about 0.2 to about 7 parts by weight per 100 parts by weight of elastomer. The present invention provides for particularly good low cure reversion where zinc oxide is present at levels in the range of from about 0.5 to about 5.0 parts by weight per 100 parts by weight of elastomer.

The elastomer polymer composition may also contain other additives such as lubricants, fillers, plasticizers, tackifiers, coloring agents, blowing agents, and antioxidants.

Examples of fillers include inorganic fillers such as reinforcing grade carbon black, silica, calcium carbonate, talc and clay, and organic fillers such as high-styrene resin, coumarone-indene resin, phenolic resin, lignin, modified melamine resins and petroleum resins.

Examples of lubricants include petroleum-type lubricants such as oils, paraffins, and liquid paraffins, coal tar-type lubricants such as coal tar and coal tar pitch; fatty oil-type lubricants such as castor oil, linseed oil, rapeseed oil and coconut oil; tall oil; waxes such as beeswax, carnauba wax and lanolin; fatty acids and fatty acid salts such as linoleic acid, palmitic acid, barium stearate, calcium stearate and zinc laureate; and synthetic polymeric substances such as petroleum resins.

Examples of plasticizers include hydrocarbon oils, e.g., paraffin, aromatic and napththenic oils, phthalic acid esters, adipic acid esters, sebacic acid esters and phosphoric acid-type plasticizers.

Examples of tackifiers are petroleum resins, coumarone-indene resins, terpene-phenol resins, and xylene/formaldehyde resins.

Examples of coloring agents are inorganic and organic pigments.

Examples of blowing agents are sodium bicarbonate, ammonium carbonate, N,N'-dinitrosopentamethylenetetramine, azocarbonamide, azobisisobutyronitrile, benzenesulfonyl hydrazide, toluenesulfonyl hydrazide, calcium amide, p-toluenesulfonyl azide, salicyclic acid, phthalic acid and urea.

The vulcanizable composition may be prepared and blended using any suitable mixing device such as an internal mixer (Brabender Plasticorder), a Banbury Mixer, a mill mixer, a kneader or a similar mixing device. Blending temperatures and times may range from about 45° C. to 180° C. and 4 to 10 minutes respectively. After forming a homogeneous mixture of the elastomers and optional fillers, processing aids, antioxidants and the like, the mixture is then vulcanized by the further mixing-in of crosslinking agents and accelerators followed by heating the resulting blend to a temperature of from about 100° to 200° C., more preferably from about 110° to 180° C. for a period of time ranging from about 1 to 60 minutes. It has been found that intermolecular crosslinking is especially facilitated using a sulfur system when the vulcanization temperature is maintained within the 120 °C. to 160° C. range. Molded articles such as belts, tire components and hoses are prepared by shaping the prevulcanized formulation using an extruder or a mold, and subjecting the composition to temperatures and curing times as set forth above.

The following examples are illustrative of the invention. The materials used in the examples described below were as follows:

MA-IPMS A copolymer of about 97.5 mole % isobutylene, 1.7 mole % paramethylstyrene and 0.8 mole % of the 4-(methacrylic acid-methyl) ester of styrene, as prepared in Example A.

SA-IPMS A copolymer of about 97.5 mole % isobutylene, 1.7 mole % paramethylstyrene and 0.8 mole % of the 4-(sorbic acid-methyl) ester of styrene, as prepared in Example B.

NR Natural rubber (SMRL) having a Mooney Viscosity ML(1+4) at 100° C. of 45–55.

NATSYN 2200 A synthetic polyisoprene (PI) having a Mooney Viscosity ML(1+4) at 100° C. of 70– 90.

SBR 1502 A copolymer of butadiene and 23.5 wt % of bound styrene having a Mooney Viscosity ML (1+4) at 100° C. of 35.

BUTYL 268 A copolymer of 98.5 mole % isobutylene and 1.5 mole % isoprene having a Mooney Viscosity ML(1+8) at 125° C. of 55.

ZnO Finely divided Zinc oxide.

TMTDS Tetramethyl thiuram disulfide.

ETHYL ZIMATE Zinc diethyldithiocarbamate.

EXAMPLE A

A methacryclic acid derivative of an isobutylene/paramethylstyrene/para-bromomethystyrene base terpolymer (MA-IPMS) was prepared as follows:

A 5000 mL glass-jacketed reaction vessel fitted with an overhead stirrer, a hose connector and a septum was purged with nitrogen. At room temperature under nitrogen, the vessel was charged with toluene (3100 mL) and 475 g of the base isobutylene/para- methylstyrene/para-bromomethystyrene terpolymer comprising 2.4 mole percent total paramethylstyrene, including 1.05 mole percent para-bromomethylstyrene, and having a Mooney viscosity of 65 (1+8 min., 125° C.). The base terpolymer was dissolved by stirring at room temperature overnight. A tetrabutylammonium salt of methacrylic acid was prepared in a second flask by charging 123.6 mL tetrabutylammonium hydroxide (1.0M in methanol) 9.6 mL methacrylic acid, 1.02 g 4-hydroxybenzophenone and 100 mL isopropanol (IPA) to the flask and swirling the contents of the flask at room temperature, giving a water-white clear solution. This solution was then added to the flask containing the dissolved base terpolymer, at a circulating bath temperature of 83° C. After 45 minutes, the bath temperature was raised to 95° C. and let to run for 7.5 h. Then the bath temperature was lowered to 70° C., and after a 2.5 h period, the reaction was let to cool. The yellowish viscous solution was quenched and washed with 10 mL HCl in 1000 mL distilled water, and subsequently washed with $H_2O$/IPA (70:30) 5 to 6 times. The polymer was isolated by precipitation into isopropanol and dried in vacuo for 48 h at 1 mm Hg and 80° C. Solution viscosity of the recovered material was identical to the starting material, and $^1$HNMR (400 MHz, $CDCl_3$) analysis of the functionalized polymer indicated quantative conversion of the benzyl bromide. The results of NMR analysis show 0.83 mol % of methacrylate and 0.1 mol % benzophenone functionality in the polymer.

EXAMPLE B

This example shows the preparation of the sorbic acid, i.e., 2,4-hexadienoic acid, derivative of isobutylene/para-methylstyrene/para-bromomethylstyrene terpolymer (SA-IPMS).

The process of Example A was repeated as set forth therein using the same base terpolymer except that the charge to the second flask was 119 mL of tetrabutylammonium hydroxide (1.0M in methanol), 12.3 g of sorbic acid, 2.04 g of 4-hydroxybenzophenone and 100 mL of isopropanol.

Solution viscosity of the recovered material was identical to the starting material, and $^1$HNMR (400 $MH_z$, $CDCl_3$) analysis of the functionalized polymer indicated quantitative conversion of the benzyl bromide. The results of NMR analysis show 0.77 mol % of sorbate and 0.2 mol % of benzophenone.

EXAMPLE 1

Rubber Masterbatches (MB) were prepared by blending 100 parts by weight of MA-IPMS and 50 parts by weight of N-660 reinforcing grade carbon black on a two roll mill at a temperature of 40° C. and for a period of 10 minutes. This Masterbatch is designated MA-MB. A separate Masterbatch was also prepared by blending 100 parts by weight of NR and 50 parts by weight of the carbon black in the same manner, and designated NR-MB. Portions of these Masterbatches were blended at the ratios set forth in runs B through G in Table 1. Then, 15 parts by weight of each blended Masterbatch and control Masterbatches A and H were further compounded with the curatives set forth in the Table by mixing in a two roll mill at a temperature of about 18° C. for a period of about 4 minutes. All formulation quantities in Table 1 are parts by weight (PBW).

Curing behavior of these blends was then evaluated using a Monsanto Oscillating Disk Rheometer at 160° C.– 3 degree arc for 60 minutes. The initial ML and 60 min MH values are reported in Table 1.

TABLE 1

|  | A | B | C | D | E | F | G | H |
|---|---|---|---|---|---|---|---|---|
| MA-MB | 100 | 95 | 90 | 85 | 70 | 50 | 30 | 0 |
| NR-MB | 0 | 5 | 10 | 15 | 30 | 50 | 70 | 100 |
| MASTER BATCH (PBW) | 15 | 15 | 15 | 15 | 15 | 15 | 15 | 15 |
| ZnO | 0.3 | 0.3 | 0.3 | 0.3 | 0.3 | 0.3 | 0.3 | 0.3 |
| SULFUR | 0.15 | 0.15 | 0.15 | 0.15 | 0.15 | 0.15 | 0.15 | 0.15 |
| TMTDS | 0.05 | 0.05 | 0.05 | 0.05 | 0.05 | 0.05 | 0.05 | 0.05 |
| ETHYL ZIMITE | 0.1 | 0.1 | 0.1 | 0.1 | 0.1 | 0.1 | 0.1 | 0.1 |
| 60 MIN. RHEOMETERS AT 160° C./3 DEG. ARC ||||||||| 
| ML(LB-IN) | 39.06 | 32.35 | 34.81 | 26.43 | 17.88 | 12.65 | 4.34 | 3.84 |
| MH(LB-IN) | 63.11 | 70.61 | 91.71 | 91.48 | 90.51 | 86.54 | 60.21 | 43.82 |
| MH-ML (LB-IN) | 24.05 | 38.26 | 56.89 | 65.05 | 72.63 | 73.88 | 55.87 | 39.99 |
| $T_S2$(MIN) | 2.91 | 1.19 | 1.09 | 1.06 | 1.12 | 1.11 | 1.01 | 1.32 |
| T50(MIN) | 20.76 | 5.09 | 3.61 | 2.44 | 2.04 | .85 | 1.60 | 1.84 |
| T90(MIN) | 49.32 | 22.72 | 14.91 | 11.41 | 8.07 | 329 | 1.98 | 2.20 |
| SLOPE @ T50 | 0.50 | 3.10 | 5.70 | 9.50 | 48.50 | 100.60 | 125.30 | 71.30 |

Differential Rheometer values (MH minus ML) shown in Table 1 demonstrate a remarkable and synergistic curing efficiency for the blended polymers as compared to the unblended polymers represented by samples A and H. At all blend levels the curing efficiency consistently surpassed the tie-line values for purely intramolecular curing which would be expected to range between the MH-ML value of 24.05 for the composition containing only the ester functionalized isobutylene/paramethylstyrene terpolymer (A) and the MH-ML value of 39.99 for the composition containing only natural rubber (H) as elastomeric components. This phenomenon reflects intermolecular (or cross) curing between the ester-modified copolymer phase and the natural rubber phase, in addition to the expected intramolecular curing of these individual phases.

EXAMPLE 2 (Control)

Runs A through H of Example 1 were repeated in all respects and with the same curatives as set forth in Example 1 except that the ester modified isobutylene/para-methylstyrene elastomer (MA-IPMS) was completely replaced with a non-halogenated copolymer of isobutylene and isoprene identified above as Butyl 268.

Rheometer values for the various runs are shown in Table 2.

TABLE 2

|  | A | B | C | D | E | F | G | H |
|---|---|---|---|---|---|---|---|---|
| BUTYL 268-MB | 100 | 95 | 90 | 80 | 70 | 50 | 30 | 0 |
| NR-MB | 0 | 5 | 10 | 20 | 30 | 50 | 70 | 100 |
| MASTER BATCH (PBW) | 15 | 15 | 15 | 15 | 15 | 15 | 15 | 15 |
| Curatives | (SAME AS EXAMPLE 1) ||||||||
| 60 MIN. RHEOMETERS AT 160° C./3 DEG. ARC |||||||||
| MH(LB-IN) | 66.45 | NT | 23.03 | 29.98 | 34.61 | 47.17 | 51.33 | 42.42 |
| ML(LB-IN) | 13.57 | NT | 13.83 | 12.61 | 10.29 | 6.42 | 3.37 | 1.39 |
| MH-ML (LB-IN) | 52.88 | NT | 9.20 | 17.37 | 24.32 | 40.75 | 47.96 | 41.03 |
| Ts2(MIN) | 2.16 | NT | 1.24 | 1.22 | 1.09 | 1.17 | 1.16 | 1.29 |
| T50(MIN) | 7.11 | NT | 1.64 | 1.69 | 1.60 | 1.75 | 1.67 | 1.66 |
| T90(MIN) | 24.52 | NT | 2.68 | 2.41 | 2.16 | 2.09 | 2.03 | 2.00 |
| SLOPE @ 150 | 2.60 | NT | 6.40 | 14.10 | 30.90 | 26.79 | NT | 85.80 |

NT — Not Tested

A comparison of the differential rheometer values (MH minus ML) shows that at natural rubber levels below about 50% by weight there is a marked fall-off of curing efficiency well below the tieline values which range between 52.88 and 41.03 for the compositions containing only Butyl 268 and natural rubber respectively. Rheometer values somewhat above tie line are demonstrated for blends containing 50% by weight and greater of natural rubber, probably due to natural rubber overcure at these higher natural rubber levels.

The comparative differential Rheometer values for compositions prepared in Examples 1 and 2 are graphically illustrated in FIG. 1.

EXAMPLE 3

Example 1 was repeated in all respects as set forth therein except that an elastomeric copolymer of butadiene and styrene, identified above as SBR-1502, was used as the diolefin copolymer component instead of natural rubber. Formulation and rheometry data are shown in Table 3.

TABLE 3

|  | A | B | C | D | E | F | G | H |
|---|---|---|---|---|---|---|---|---|
| MA-MB | 100 | 95 | 90 | 85 | 70 | 50 | 30 | 0 |
| SBR-MB | 0 | 5 | 10 | 15 | 30 | 50 | 70 | 100 |
| MASTER BATCH (PBW) | 15 | 15 | 15 | 15 | 15 | 15 | 15 | 15 |
| Curvatives | (SAME AS EXAMPLE 1) | | | | | | | |
| 60 MIN. RHEOMETERS AT 160° C./3 DEG. ARC | | | | | | | | |
| ML (LB-IN) | 37.19 | 37.65 | 31.03 | 22.72 | 19.79 | 17.73 | 14.19 | 7.79 |
| MH (LB-IN) | 62.74 | 68.59 | 70.26 | 66.35 | 84.86 | 101.39 | 96.20 | 92.48 |
| MH-ML (LB-IN) | 25.55 | 30.94 | 39.23 | 43.62 | 65.07 | 83.65 | 82.00 | 84.69 |
| Ts2(MIN) | 4.46 | 1.19 | 1.21 | 1.24 | 1.25 | 1.34 | 1.48 | 1.51 |
| T50(MIN) | 25.48 | 5.57 | 3.87 | 3.62 | 2.92 | 3.24 | 3.05 | 3.02 |
| T90(MIN) | 49.98 | 26.82 | 22.48 | 20.58 | 23.55 | 27.37 | 15.12 | 5.82 |
| SLOPE @ T50 | 0.60 | 1.40 | 2.50 | 3.10 | 9.40 | 9.70 | 30.90 | 42.40 |

EXAMPLE 4

Example 3 was repeated in all respects as set forth therein except that the methyl acrylate ester copolymer used in Example 3 (MA-IPMS) was completely replaced with the sorbic acid ester copolymer defined above as SA-IPMS. Formulation and rheometry data are shown in Table 4.

TABLE 4

|  | A | B | C | D | E | F | G | H |
|---|---|---|---|---|---|---|---|---|
| SA-MB | 100 | 95 | 90 | 85 | 70 | 50 | 30 | 0 |
| SBR-MB | 0 | 5 | 10 | 15 | 30 | 50 | 70 | 100 |
| MASTER BATCH (PBW) | 15 | 15 | 15 | 15 | 15 | 15 | 15 | 15 |
| Curvatives | (SAME AS EXAMPLE 1) | | | | | | | |
| 60 MIN. RHEOMETERS AT 160° C./3 DEG. ARC | | | | | | | | |
| ML (LB-IN) | 31.25 | 29.00 | 26.20 | 23.56 | 19.04 | 16.87 | 13.19 | 7.79 |
| MH (LB-IN) | 55.18 | 52.60 | 64.78 | 70.28 | 77.36 | 94.68 | 88.55 | 92.48 |
| MH-ML (LB-IN) | 23.93 | 23.60 | 38.57 | 46.72 | 58.32 | 77.80 | 75.36 | 84.69 |
| Ts2(MIN) | 3.70 | 2.18 | 1.61 | 1.49 | 1.42 | 1.42 | 1.54 | 1.51 |
| T50(MIN) | 21.51 | 8.21 | 8.17 | 7.49 | 4.38 | 3.43 | 3.06 | 3.02 |
| T90(MIN) | 51.69 | 34.69 | 29.35 | 27.50 | 24.17 | 20.35 | 12.28 | 5.82 |
| SLOPE @ T50 | 0.30 | 0.90 | 1.40 | 1.80 | 3.50 | 10.80 | 30.30 | 42.40 |

Figure 2:
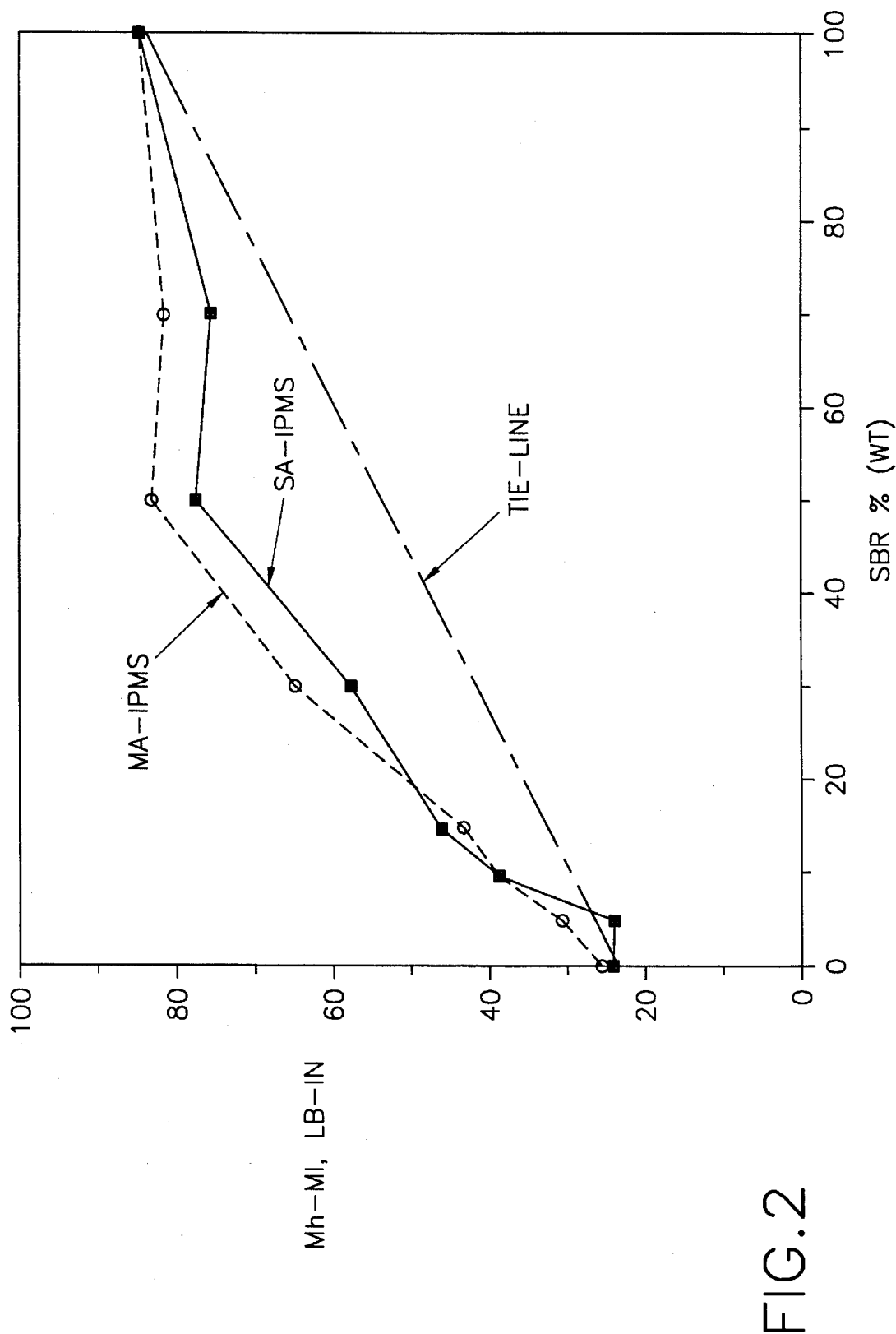
FIG. 2 is also a plot of curing behavior for blends containing butadiene/styrene copolymer rubber and different ester-modified isobutylene/paramethylstyrene copolymers.

As is graphically shown in FIG. 2, the differential rheometer torque values achieved in the compositions of Examples 3 and 4 consistently exceed the expected tie line values, except for an anomalous result of 23.60 in formulation B of Example 4. This is indicative of enhanced vulcanization efficiency due to the presence intermolecular as well as intramolecular crosslinking.

EXAMPLE 5

Example 1 was repeated in all respects as set forth therein except that the methyl acrylate ester used in Example 1 (MA-IPMS) was completely replaced with the sorbic acid ester identified above as SA-IPMS. Formulation and rheometry data are shown in Table 5.

TABLE 5

|  | A | B | C | D | E | F | G | H |
|---|---|---|---|---|---|---|---|---|
| SA-MB | 100 | 95 | 90 | 85 | 70 | 50 | 30 | 0 |
| NR-MB | 0 | 5 | 10 | 15 | 30 | 50 | 70 | 100 |
| MASTER BATCH (PBW) | 15 | 15 | 15 | 15 | 15 | 15 | 15 | 15 |
| Curvatives | (SAME AS EXAMPLE 1) | | | | | | | |
| 60 MIN. RHEOMETERS AT 160° C./3 DEG. ARC | | | | | | | | |
| ML (LB-IN) | 24.05 | 26.29 | 24.88 | 23.19 | 18.49 | 10.88 | 6.81 | 1.39 |
| MH (LB-IN) | 48.37 | 57.62 | 68.87 | 72.03 | 71.55 | 68.69 | 60.81 | 42.42 |
| MH-ML (LB-IN) | 24.32 | 31.33 | 44.00 | 48.84 | 53.06 | 57.81 | 54.00 | 41.03 |
| Ts2(MIN) | 3.00 | 1.46 | 1.40 | 1.24 | 1.52 | 1.19 | 1.21 | 1.29 |
| T50(MIN) | 16.10 | 4.73 | 4.16 | 3.46 | 2.93 | 1.96 | 1.84 | 1.66 |
| T90(MIN) | 48.34 | 16.80 | 18.02 | 16.21 | 16.64 | 11.35 | 2.23 | 2.00 |
| SLOPE @ T50 | 0.50 | 2.60 | 4.10 | 5.80 | 10.30 | 71.50 | 1115.30 | 85.80 |

Once again, differential rheometer values are consistently above the tie-line values.

EXAMPLE 6

Example 1 was repeated as set forth therein except that the natural rubber component of the blend was replaced completely by a synthetic polyisoprene identified above as NATSYN 2200. Formulation and rheometry data are shown in Table 6.

TABLE 6

|  | A | B | C | D | E | F | G | H |
|---|---|---|---|---|---|---|---|---|
| MA-MB | 100 | 95 | 90 | 85 | 70 | 50 | 30 | 0 |
| PI-MB | 0 | 5 | 10 | 15 | 30 | 50 | 70 | 100 |
| MASTER BATCH (PBW) | 15 | 15 | 15 | 15 | 15 | 15 | 15 | 15 |
| Curvatives | (SAME AS EXAMPLE 1) | | | | | | | |
| 60 MIN. RHEOMETERS AT 160° C./3 DEG. ARC | | | | | | | | |
| ML (LB-IN) | 39.06 | 32.73 | 34.35 | 30.19 | 14.04 | 7.24 | 2.82 | 1.22 |
| MH (LB-IN) | 63.11 | 65.82 | 76.70 | 91.58 | 88.21 | 77.02 | 64.65 | 48.08 |
| MH-ML (LB-IN) | 24.05 | 33.09 | 42.35 | 61.39 | 74.17 | 69.78 | 61.83 | 46.85 |
| Ts2(MIN) | 2.91 | 1.18 | 1.70 | 0.99 | 0.97 | 1.07 | 1.15 | 1.24 |
| T50(MIN) | 20.76 | 6.59 | 6.09 | 2.60 | 1.76 | 1.84 | 1.82 | 1.87 |
| T90(MIN) | 49.32 | 38.13 | 34.95 | 14.71 | 6.05 | 2.33 | 2.14 | 2.12 |
| SLOPE @ T50 | 0.50 | 1.40 | 1.50 | 6.00 | 61.50 | 86.80 | 122.50 | 104.60 |

The data in Table 6 shows increased curing efficiency above tie-line values at all blend levels.

The following example illustrates the use of a peroxide cure system for preparing the covulcanizates of this invention.

EXAMPLE 7

Example 6 was repeated as set forth above except that the ZnO, sulfur, TMTDA and Ethyl Zimate curing system was eliminated and replaced with dicumylperoxide used at a level of 2% by weight per hundred parts of rubber (pHR). Formulation and rheometry data are shown in Table 7.

TABLE 7

|  | A | B | C | D | E | F | G | H |
|---|---|---|---|---|---|---|---|---|
| MA-MB | 100 | 95 | 90 | 85 | 70 | 50 | 30 | 0 |
| PI-MB | 0 | 5 | 10 | 15 | 30 | 50 | 70 | 100 |

TABLE 7-continued

|  | A | B | C | D | E | F | G | H |
|---|---|---|---|---|---|---|---|---|
| MASTER BATCH (PBW) | 15 | 15 | 15 | 15 | 15 | 15 | 15 | 15 |
| Di-CUMYL PEROXIDE | 0.2 | 0.2 | 0.2 | 0.2 | 0.2 | 0.2 | 0.2 | 0.2 |
| 60 MIN. RHEOMETERS AT 160° C./3 DEG. ARC ||||||||| 
| ML (LB-IN) | 15.80 | 22.90 | 21.98 | 16.23 | 12.01 | 8.43 | 5.27 | 2.03 |
| MH (LB-IN) | 51.01 | 49.04 | 51.42 | 51.17 | 48.46 | 49.94 | 42.75 | 39.34 |
| MH-ML (LB-IN) | 35.45 | 26.14 | 29.44 | 34.94 | 36.45 | 41.51 | 37.48 | 37.30 |
| Ts2(MIN) | 1.66 | 1.76 | 1.63 | 1.60 | 1.57 | 1.39 | 1.54 | 1.29 |
| T50(MIN) | 3.29 | 3.49 | 3.46 | 3.62 | 3.85 | 3.77 | 4.25 | 3.98 |
| T90(MIN) | 6.76 | 8.38 | 8.33 | 8.35 | 8.43 | 8.43 | 9.48 | 8.84 |
| SLOPE @ T50 | 8.80 | 5.10 | 5.70 | 6.40 | 6.20 | 6.90 | 5.50 | 5.60 |

The data in Table 7 shows increased curing efficiency above tie-line values at blend levels of polyisoprene above about 30% by weight.

EXAMPLE 8

In this example, a series of rubber formulations were prepared, cured and physical properties were evaluated. The composition of these formulations (parts by weight), curing conditions and physical property data is shown in Table 8. The elastomer identified as XP-50 is a non-halogenated random copolymer of isobutylene and paramethylstyrene (PMS) having a PMS content of about 5.0 wt %; the elastomer identified as BZMA is a methacrylic acid derivative of an isobutylene/para-methylstyrene/para-bromomethylstyrene terpolymer prepared as in Example A, but having a content of about 0.7 mole % methacrylate and 0.1 mole % benzophenone; the elastomer identified as BZMA-1 is similar to BZMA except that is has a methacrylate content of about 0.35 mole %; NR is natural rubber and PI is synthetic polyisoprene as disclosed above.

Formulations A, B and C of Table 8 are formulations containing a non-functionalized isobutylene/para-methylstyrene copolymer which are outside the scope of this invention. No intervulcanization between different polymer molecules takes place under curing conditions using a sulfur curing system.

Formulations D, E and F of Table 8 are formulations within the invention cured with a sulfur curing system and formulations G, H and I are formulations within the invention cured using a peroxide system (di-cumyl peroxide).

Achievement of a truly intervulcanized composition is reflected by enhanced tensile and elongation properties for formulations D through I as compared with formulations A through C, where no intermolecular crosslinking takes place during the vulcanization process.

TABLE 8

|  | A | B | C | D | E | F | G | H | I |
|---|---|---|---|---|---|---|---|---|---|
| NR | 30 | 50 | 70 | 30 | 50 | 70 | — | — | — |
| XP-50 | 70 | 50 | 30 | — | — | — | — | — | — |
| PI | — | — | — | — | — | — | 30 | 50 | 70 |
| BZMA | — | — | — | 70 | 50 | 30 | — | — | — |
| BZMA-1 | — | — | — | — | — | — | 70 | 50 | 30 |
| CAR. BLK | 50 | 50 | 50 | 50 | 50 | 50 | 50 | 50 | 50 |
| ZnO | 2 | 2 | 2 | 2 | 2 | 2 | — | — | — |
| Sulfur | 1 | 1 | 1 | 1 | 1 | 1 | — | — | — |
| TMTDS | 0.3 | 0.3 | 0.3 | 0.3 | 0.3 | 0.3 | — | — | — |
| ETHYL ZIMATE | 0.7 | 0.7 | 0.7 | 0.7 | 0.7 | 0.7 | — | — | — |
| DICUP 40 KE | — | — | — | — | — | — | 4 | 4 | 4 |
| CURE TIME (MIN) | 20 | 10 | 10 | 30 | 30 | 20 | 12 | 12 | 12 |
| CURE TEMP (°C.) | 160 | 160 | 160 | 160 | 160 | 160 | 170 | 170 | 170 |
| PHYSICAL PROPERTIES ||||||||||
| SHORE A HARDNESS | 64.9 | 62.3 | 58.9 | 61.5 | 58 | 53.5 | 54.9 | 52.3 | 52.1 |
| TENSILE @ 100% MPA | 2.42 | 2.52 | 2.01 | 3.29 | 2.5 | 2.0 | 2.1 | 2.0 | 1.65 |
| TENSILE @ 200% MPA | 3.43 | 5.5 | 4.88 | 9.55 | 6.94 | 5.0 | 6.5 | 6.5 | 5.38 |
| TENSILE @ 300% MPA | — | 7.84 | 8.73 | — | — | 10.02 | 11.52 | 11.47 | 10.71 |
| TENSILE @ BREAK MPA | 3.47 | 8.13 | 13.66 | 11.55 | 10.63 | 17.59 | 13.37 | 15.4 | 16.83 |
| ELONGATION @ BREAK | 207 | 332 | 437 | 217 | 263 | 453 | 336 | 373 | 415 |
| TEAR DIE B Kn/M2 | 24.89 | 27.78 | 25.3 | — | — | — | 19.3 | 20.6 | 17.6 |

What is claimed is:

1. A vulcanizable composition comprising a mixture of: a) an elastomeric copolymer having a number average molecular weight of at least 10,000 containing polymerized isoolefin of 4 to 7 carbon atoms and para-alkylstyrene monomer units and containing from about 0.01 up to about 10 mole % of Y functional groups randomly distributed along and pendant to the elastomeric polymer chain, said Y functional groups containing an olefinic or vinyl double bond positioned alpha, beta to a substituent group which actives said double bond towards free radical addition reactions; b) a diolefin nomopolymer or copolymer rubber; the weight ratio of said elastomeric copolymer and diolefin nomopolymer or copolymer rubber present in said mixture being within the range of about 1:99 to 99:1.

2. The composition of claim 1 wherein said substituent group is selected from the group consisting of carbonyl-containing groups, phosphoryl-containing groups, sulfonyl-containing groups, a nitrile-containing group and an aromatic ring-containing group.

3. The composition of claim 1 wherein said substituent group is a carbonyl-containing group.

4. The composition of claim 1 wherein said Y functional group is an ester group represented by the structure:

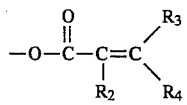

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about 28 carbon atoms.

5. The composition of claim 1 wherein said elastomeric copolymer is a random interpolymer comprising at least about 80 weight % of polymerized isoolefin containing from 4 to 7 carbon atoms and from about 0.05 up to about 20 weight % of aromatic monomer units comprising a mixture of the following structures (a) and (b) randomly distributed therein:

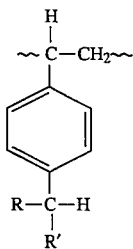

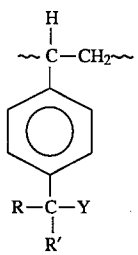

wherein R and R' are independently selected from the group consisting of hydrogen and $C_1$ to $C_4$ alkyl.

6. The composition of claim 5 wherein said substituent group is a carbonyl-containing group.

7. The composition of claim 6 wherein said Y functional group is an ester group represented by the structure:

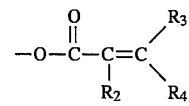

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about 28 carbon atoms.

8. The composition of claim 5 wherein said $C_4$ to $C_7$ isoolefin is isobutylene and said copolymer contains at least about 90 weight % isobutylene and wherein R and R' are each hydrogen.

9. The composition of claim 7 wherein $R_2$ is methyl and $R_3$ and $R_4$ are each hydrogen.

10. The composition of claim 7 wherein $R_2$, $R_3$ and $R_4$ are each hydrogen.

11. The composition of claim 7 wherein $R_2$ and $R_3$ are each hydrogen and $R_4$ is $C_4$ alkenyl.

12. The composition of claim 1 containing from about 0.05 to about 2.0 mole % of said Y ester groups.

13. The composition of claim 5 wherein from about 5 up to about 60 mole % of said mixed aromatic monomer units have the structure (b).

14. The composition of claim 5 wherein said elastomeric romopolymer has a number average molecular weight in the range of from about 25,000 to about 750,000 and a compositional distribution (Mw/Mn) of less than about 5.

15. The composition of claim 1 wherein said diolefin romopolyer or copolymer comprises an elastomer selected from the group consisting of polybutadiene, copolymers of butadiene with styrene or acrylonitrile, natural rubber, polychloroprene, polyisoprene, copolymers of ethylene, propylene and up to 10 wt % of a non-conjugated diene, copolymers of isobutylene and up to 10 wt % of isoprene, and mixtures thereof.

16. The composition of claim 1 further containing an accelerated sulfur curing system.

17. The composition of claim 16 further containing zinc oxide.

18. The composition of claim 1 further containing a peroxide curing system.

19. The composition of claim 1 further containing a reinforcing filler.

20. A process for preparing an intervulcanized elastomer composition comprising:
  i) forming the mixture as defined in claims 1 or 7, and
  ii) subjecting said mixture to free-radical curing conditions for a period of time sufficient to vulcanize said composition.

21. The process of claim 20 wherein said free radical curing conditions include heating said composition to a temperature in the range of from about 100° C. to about 180° C.

22. The process of claim 21 wherein said composition contains an accelerated sulfur curing system.

23. The process of claim 21 wherein said composition contains a peroxide curing system.

24. The process of claim 21 wherein said temperature ranges from about 120° C. to about 160° C.

25. An intervulcanized composition produced by the process of claim 20.

26. The vulcanizable composition of claim 1 further characterized that, when formulated with a curing system and subjected to vulcanization conditions, the composition exhibits a maximum rheometer torque increase ratio in accordance with the formula:

$\Delta M_{a+b}/(\Delta M_a f_a + \Delta M_b f_b)$ of greater than 1.25, wherein:

$\Delta M_{a+b}$=the torque increase observed for the blend of polymer (a) and polymer (b);

$\Delta M_a$=the torque increase observed for polymer (a) on its own;

$f_a$=the weight fraction of polymer (a) in the blend;

$\Delta M_b$=the torque increase observed for polymer (b) on its own; and $f_b$=the weight fraction of polymer (b) in the blend.

27. The vulcanizable composition of claim 26 wherein said rheometer torque is measured using an oscillating disc rheometer, cure time 60 minutes at 160° C. and 3° arc.

28. The vulcanizable composition of claim 26 wherein said torque increase ratio is greater than 1.5.

29. The vulcanizable composition of claim 26 wherein said torque increase ratio is greater than 2.0.

30. An intervulcanized composition of a blend of elastomer and rubber according to claim 1.

31. The composition of claim 30 wherein the elastomeric copolymer is a random interpolymer containing at least about 80 weight % of polymerized isoolefin containing from 4 to 7 carbon atoms and from about 0.05 up to 20 weight % of para-alkylstyrene monomer units containing benzylic Y groups.

32. The composition of claim 31 wherein said benzylic Y groups are selected from the group consisting of carbonyl-containing groups, phosphoryl-containing groups, sulfonyl-containing groups, nitrile-containing groups and aromatic ring-containing groups.

33. The composition of claim 32 wherein said Y group is an ester group represented by the structure:

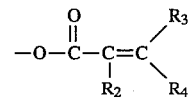

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about carbon atoms.

34. The composition of claim 31 wherein said $C_4$ to $C_7$ isoolefin is isobutylene and said copolymer contains at least about 90 weight % isobutylene.

35. The composition of claim 33 wherein $R_2$ is methyl and $R_3$ and $R_4$ are each hydrogen.

36. The composition of claim 33 wherein $R_2$, $R_3$ and $R_4$ are each hydrogen.

37. The composition of claim 33 wherein $R_2$ and $R_3$ are each hydrogen and $R_4$ is $C_4$ alkenyl.

38. The composition of claim 33 containing from about 0.05 to about 2.0 mole % of said Y ester groups.

39. The composition of claim 31 wherein said interpolymer has a number average molecular weight in the range of from about 25,000 to about 750,000 and a compositional distribution (Mw/Mn) of less than about 5.

40. The composition of claim 30 wherein said diolefin romopolymer or copolymer comprises an elastomer selected from the group consisting of polybutadiene, copolymers of butadiene with styrene or acrylonitrile, natural rubber, polychloroprene, polyisoprene, copolymers of ethylene, propylene and up to 10 wt % of a non-conjugated diene, copolymers of isobutylene and up to 10 wt % of isoprene, and mixtures thereof.

41. The composition of claim 30 further containing an accelerated sulfur curing system.

42. The composition of claim 41 further containing zinc oxide.

43. The composition of claim 30 further containing a peroxide curing system.

44. The composition of claim 30 further containing a reinforcing filler.

* * * * *